(12) United States Patent
Akiyama

(10) Patent No.: US 10,976,653 B1
(45) Date of Patent: Apr. 13, 2021

(54) LIGHT SOURCE DEVICE AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 196 days.

(21) Appl. No.: 16/464,334

(22) PCT Filed: Nov. 7, 2017

(86) PCT No.: PCT/JP2017/040068
§ 371 (c)(1),
(2) Date: May 28, 2019

(87) PCT Pub. No.: WO2018/100977
PCT Pub. Date: Jun. 7, 2018

(30) Foreign Application Priority Data

Nov. 29, 2016 (JP) .............................. JP2016-231400

(51) Int. Cl.
*G03B 21/20* (2006.01)
*H04N 9/31* (2006.01)

(52) U.S. Cl.
CPC ......... *G03B 21/204* (2013.01); *G03B 21/208* (2013.01); *H04N 9/3152* (2013.01)

(58) Field of Classification Search
CPC G03B 21/204; G03B 21/208; G03B 21/2033; H04N 9/3152; H04N 9/3158;
(Continued)

(56) References Cited

U.S. PATENT DOCUMENTS

2014/0153276 A1 6/2014 Nozaki
2017/0227836 A1* 8/2017 Takagi ................. G03B 21/204
(Continued)

FOREIGN PATENT DOCUMENTS

JP 2012-169049 A 9/2012
JP 2014-192127 A 10/2014

OTHER PUBLICATIONS

Jan. 30, 2018 International Search Report issued in International Patent Application No. PCT/JP2017/040068.

*Primary Examiner* — Ryan D Howard
(74) *Attorney, Agent, or Firm* — Oliff PLC

(57) ABSTRACT

The invention provides a light source device that may suppress decrease of wavelength conversion efficiency by reducing optical density of excitation light in a light incident surface of a wavelength conversion layer, and provides a projector including the light source device.

The light source device of the invention includes an excitation light source that outputs an excitation light, a collecting system that collects the excitation light source, a first light-transmissive member that transmits the excitation light output from the collecting system, and a wavelength conversion layer having a first light incident surface crossing a traveling direction of the excitation light, a light exiting surface opposed to the first light incident surface, and a second light incident surface coupling an end portion of the first light incident surface and an end portion of the light exiting surface, wherein a focal point of the collecting system is formed inside of the wavelength conversion layer, and the wavelength conversion layer wavelength-converts the excitation light entering from the first light incident surface and the second light incident surface and generates a fluorescent light.

13 Claims, 6 Drawing Sheets

(58) Field of Classification Search
CPC ........ H04N 9/3161; H04N 9/317; F21K 9/64; F21S 41/176; F21V 13/08; F21V 9/30
See application file for complete search history.

(56) References Cited

U.S. PATENT DOCUMENTS

2018/0231881 A1* 8/2018 Akiyama ............. G03B 21/208
2019/0064642 A1* 2/2019 Akiyama ............. G03B 21/204

* cited by examiner

LIGHT SOURCE DEVICE AND PROJECTOR

BACKGROUND

1. Technical Field

This invention relates to a light source device and a projector.

2. Related Art

In related art, in a light source device with a laser diode as an excitation light source that converts wavelengths using a fluorescent material, for example, as described in JP-A-2012-169049, a configuration that enables downsizing of the device by providing a cooling mechanism on a substrate with the fluorescent material thereon, but not providing a complex device such as a rotation mechanism is known.

However, it is generally known that, when optical density (optical density per unit area) of excitation light in a light incident surface of a wavelength conversion layer increases, wavelength conversion efficiency (light emission efficiency) decreases. That is, a phenomenon (light saturation phenomenon) that, even when many lights enter the wavelength conversion layer, not all of the lights can be wavelength-converted occurs. Even if a heat dissipation member is provided around the wavelength conversion layer to suppress a temperature rise of the wavelength conversion layer, the wavelength conversion efficiency may decrease unless the optical density of the excitation light in the light incident surface of the wavelength conversion layer is reduced.

SUMMARY

The invention has been achieved in view of the above described problem of related art, and one of purposes is to provide a light source device that may suppress decrease of wavelength conversion efficiency by reducing optical density of excitation light in a light incident surface of a wavelength conversion layer. One of purposes of an aspect of the invention is to provide a projector including the light source device.

A light source device in one aspect of the invention includes an excitation light source that outputs an excitation light, a collecting system that collects the excitation light, a light-transmissive member that transmits the excitation light output from the collecting system, and a wavelength conversion layer having a first light incident surface crossing a traveling direction of the excitation light, a light exiting surface opposed to the first light incident surface, and a second light incident surface coupling an end portion of the first light incident surface and an end portion of the light exiting surface, wherein a focal point of the collecting system is formed inside of the wavelength conversion layer, and the wavelength conversion layer wavelength-converts the excitation light entering from the first light incident surface and the second light incident surface and generates a fluorescent light.

According to the configuration, the focal point of the collecting system is formed inside of the wavelength conversion layer, and accordingly, the excitation light transmitted through the light-transmissive member from the collecting system enters from both the first light incident surface and the second light incident surface of the wavelength conversion layer and optical density may be made lower compared to the case where the light incident surface is only the first light incident surface. Thereby, occurrence of the above described light saturation phenomenon may be suppressed and decrease of wavelength conversion efficiency in the wavelength conversion layer may be suppressed.

In the light source device in the one aspect of the invention, the focal point of the collecting system may be formed inside of the wavelength conversion layer except the first light incident surface of the wavelength conversion layer, but including the light exiting surface on an optical axis of the excitation light.

According to the configuration, for example, the focal point of the collecting system may be formed on the light exiting surface. Thereby, the excitation light enters from respective different positions on the first light incident surface and the second light incident surface, and incident locations of the excitation light into the wavelength conversion layer may be distributed.

Therefore, the optical density on the first light incident surface and the second light incident surface may be reduced. Thereby, occurrence of the light saturation phenomenon may be suppressed and decrease of wavelength conversion efficiency in the wavelength conversion layer may be suppressed.

In the light source device in the one aspect of the invention, a support member that supports the wavelength conversion layer and the light-transmissive member may be further provided at a side of the light-transmissive member opposite to the wavelength conversion layer in a direction crossing the traveling direction of the excitation light.

According to the configuration, heat generated in the wavelength conversion layer may be dissipated via the support member, and thereby, non-uniformity of a temperature of the wavelength conversion layer in the same amount of excitation light may be suppressed and fluctuations of the conversion efficiency of the wavelength conversion layer may be suppressed.

In the light source device in the one aspect of the invention, the light-transmissive member may have a first light-transmissive member having a planar surface crossing the traveling direction of the excitation light and a curved surface projecting in an opposite direction to the traveling direction of the excitation light, and placed with the planar surface opposed to the first light incident surface, and a second light-transmissive member placed on a side of the planar surface of the first light-transmissive member and having a hole penetrating in a direction along the optical axis, in a state in which the wavelength conversion layer is placed within the hole, the second light incident surface of the wavelength conversion layer may be opposed to an inner circumferential surface of the hole.

According to the configuration, the first light-transmissive member and the second light-transmissive member are provided, and thereby, the second light-transmissive member may be easily placed around the wavelength conversion layer.

In the light source device in the one aspect of the invention, a support member that supports the wavelength conversion layer and the light-transmissive member may be further provided at a side of the second light-transmissive member opposite to the wavelength conversion layer in a direction crossing the traveling direction of the excitation light, and the first light-transmissive member may be joined to the support member via a joining member.

According to the configuration, the joining member does not necessarily have light transmissivity, and accordingly, the joining member having higher heat conductivity may be used, the heat generated in the wavelength conversion layer may be efficiently transferred to the respective support member and light-transmissive member, and fluctuations of the conversion efficiency of the wavelength conversion layer may be suppressed.

In the light source device in the one aspect of the invention, the light-transmissive member may have a planar surface crossing the traveling direction of the excitation light, a concave portion opening in the planar surface, and a curved surface projecting in an opposite direction to the traveling direction of the excitation light, and, in a state in which the wavelength conversion layer is placed within the concave portion, the first light incident surface may be opposed to a bottom surface of the concave portion and the second light incident surface may be opposed to an inner circumferential surface of the concave portion.

According to the configuration, the wavelength conversion layer is placed within the concave portion formed in the light-transmissive member, and thereby, the light-transmissive member may be handled as a single member.

In the light source device in the one aspect of the invention, a support member that supports the wavelength conversion layer and the light-transmissive member may be further provided at a side of the light-transmissive member opposite to the wavelength conversion layer in a direction crossing the traveling direction of the excitation light, and the light-transmissive member may have a second concave portion for placement of the support member.

According to the configuration, placement of the support member with respect to the light-transmissive member is easier. Further, according to the configuration, a contact area between the light-transmissive member and the support member is increased by the second concave portion, and thereby, a heat dissipation property of the wavelength conversion layer via the light-transmissive member may be improved and a temperature rise of the wavelength conversion layer may be suppressed.

In the light source device in the one aspect of the invention, the light-transmissive member may be formed using sapphire.

According to the configuration, the light-transmissive member is formed using the sapphire having higher heat conductivity, and thereby, the heat dissipation property in the light-transmissive member may be improved.

In the light source device in the one aspect of the invention, a dielectric multilayer film that transmits the excitation light and reflects the fluorescent light may be provided between the first light incident surface of the wavelength conversion layer and the light-transmissive member and the second light incident surface of the wavelength conversion layer and the light-transmissive member.

According to the configuration, output of the excitation light (fluorescent light) converted by the wavelength conversion layer toward the light-transmissive member may be suppressed, the fluorescent light may be reliably output from the light exiting surface, and the decrease of the wavelength conversion efficiency in the light source device may be suppressed.

A projector of the invention includes the above described light source, a light modulation device that modulates a light output from the light source device according to image information and generates an image light, and a projection system that projects the image light.

According to the configuration, the projector including the light source device having excellent wavelength conversion efficiency may be obtained, and the projector with higher reliability may be provided.

DESCRIPTION OF EXEMPLARY EMBODIMENTS

As below, embodiments of the invention will be explained with reference to the drawings.

Note that, in the respective drawings used in the following explanation, to clearly show characteristics, characteristic parts may be enlarged and shown for convenience and the dimension ratios of the respective component elements or the like are not necessarily the same as real ones.

First Embodiment (Projector)

A projector of the embodiment is an example of a projector using three transmissive liquid crystal light valves as light modulation devices. Note that, as the light modulation devices, reflective liquid crystal light valves may be used. Alternatively, as the light modulation devices, other light modulation devices including devices using micromirrors e.g. DMDs (Digital Micromirror Devices) or the like than the liquid crystal devices may be used.

Figure 1:
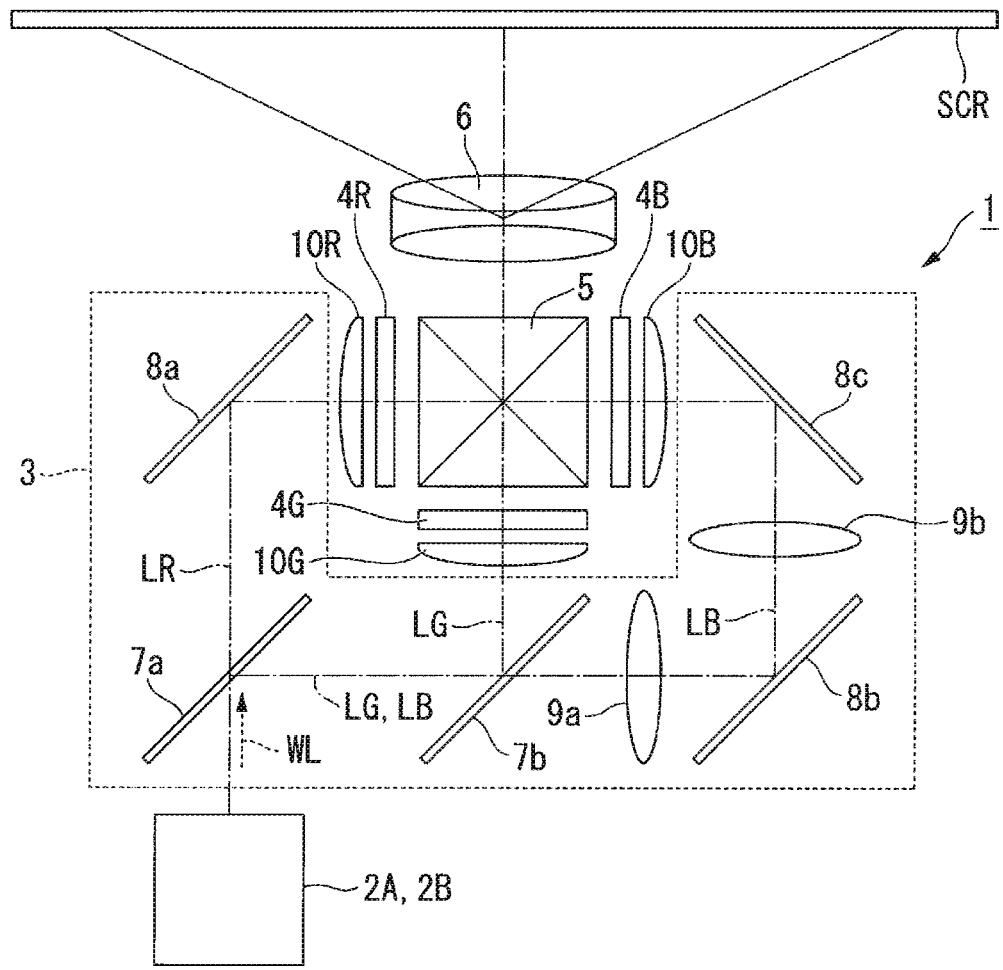
FIG. 1 is a schematic configuration diagram showing a projector of a first embodiment.

FIG. 1 is the schematic configuration diagram showing the projector of the first embodiment.

As shown in FIG. 1, a projector 1 includes a light source device 2A, a color separation system 3, a light modulation device 4R, a light modulation device 4G, a light modulation device 4B, a color combining system 5, and a projection system 6. The light source device 2A outputs an illumination light WL. The color separation system 3 separates the illumination light WL from the light source device 2A into a red light LR, a green light LG, and a blue light LB. The light modulation device 4R, the light modulation device 4G, and the light modulation device 4B modulate the red light LR, the green light LG, and the blue light LB according to image information, respectively, and form image lights of the respective colors. The color combining system 5 combines the image lights of the respective colors from the respective light modulation devices 4R, 4G, 4B. The projection system 6 projects the combined image light from the color combining system 5 toward a screen SCR.

Figure 2:
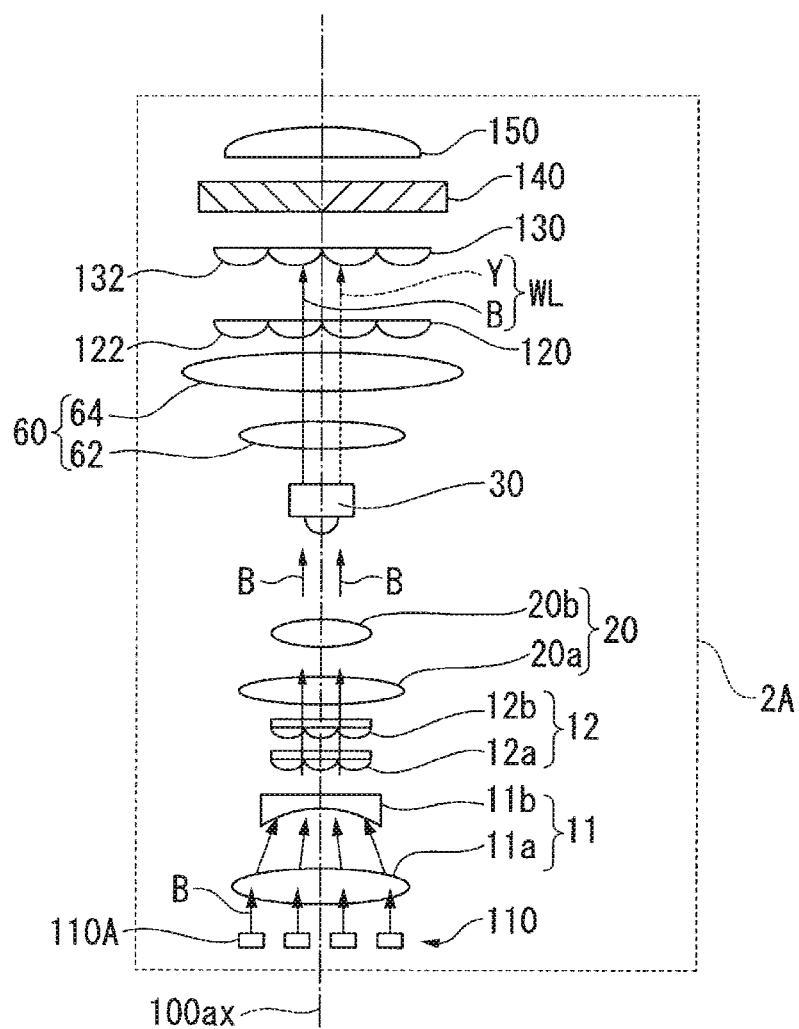
FIG. 2 shows a schematic configuration of a light source device in the first embodiment.

As shown in FIG. 2, the light source device 2A outputs the white illumination light (white light) WL formed by combination of part of a blue excitation light B output without being wavelength-converted of the blue excitation lights output from a semiconductor laser and a yellow fluorescent light Y generated by wavelength conversion of the excitation light B by a wavelength conversion element 30. The light source device 2A outputs the illumination light WL adjusted to have a substantially uniform illuminance distribution toward the color separation system 3. The specific configuration of the light source device 2A will be described later.

As shown in FIG. 1, the color separation system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a separates the illumination light WL output from the light source device 2A into the red light LR and a light of a mixture of the green light LG and the blue light LB. For the purpose, the first dichroic mirror 7a has a property of transmitting the red light LR and reflecting the green light LG and the blue light LB. The second dichroic mirror 7b separates the light of the mixture of the green light LG and the blue light LB into the green light LG and the blue light LB. For the purpose, the second dichroic mirror 7b has a property of reflecting the green light LG and transmitting the blue light LB.

The first reflection mirror 8a is placed in an optical path of the red light LR and reflects the red light LR transmitted through the first dichroic mirror 7a toward the light modulation device 4R. The second reflection mirror 8b and the third reflection mirror 8c are placed in an optical path of the blue light LB and guides the blue light LB transmitted through the second dichroic mirror 7b to the light modulation device 4B.

The first relay lens 9a and the second relay lens 9b are placed at the downstream of the second dichroic mirror 7b in the optical path of the blue light LB. The first relay lens 9a and the second relay lens 9b compensate for light loss of the blue light LB due to the optical path length of the blue light LB longer than the optical path lengths of the red light LR and the green light LG.

The respective light modulation device 4R, light modulation device 4G, and light modulation device 4B include liquid crystal panels. The respective light modulation device 4R, light modulation device 4G, and light modulation device 4B modulate the respective red light LR, green light LG, and blue light LB according to image information while passing the respective red light LR, green light LG, and blue light LB, and form image lights corresponding to the respective colors. Polarizers (not shown) are respectively provided on light-incident sides and light-exiting sides of the respective light modulation device 4R, light modulation device 4G, and light modulation device 4B.

A field lens 10R, a field lens 10G, and a field lens 10B that parallelize the respective red light LR, green light LG, and blue light LB entering the respective light modulation device 4R, light modulation device 4G, and light modulation device 4B are provided on the light-incident sides of the respective light modulation device 4R, light modulation device 4G, and light modulation device 4B.

The color combining system 5 includes a cross dichroic prism. The color combining system 5 combines the image lights of the respective colors from the respective light modulation device 4R, light modulation device 4G, and light modulation device 4B, and outputs the combined image light toward the projection system 6.

The projection system 6 includes a group of projection lenses. The projection system 6 enlarges and projects the image light combined by the color combining system 5 toward the screen SCR. Thereby, an enlarged color picture (image) is displayed on the screen SCR.

(Light Source Device)

Next, the configuration of the light source device 2A in the first embodiment will be explained.

FIG. 2 shows the schematic configuration of the light source device in the first embodiment.

As shown in FIG. 2, the light source device 2A includes an excitation light source 110, an afocal system 11, a homogenizer system 12, a collecting system 20, the wavelength conversion element 30, a pickup system 60, a first lens array 120, a second lens array 130, a polarization conversion element 140, and a superimposing lens 150.

The excitation light source 110 includes a plurality of semiconductor lasers 110A that output the blue excitation lights B of laser beams. A peak of light emission intensity of the excitation light B is e.g. 445 nm. The plurality of semiconductor lasers 110A are arranged in an array form within one plane orthogonal to an illumination light axis $100ax$. Note that, as the excitation light source 110, semiconductor lasers that output blue lights having other wavelengths e.g. 455 nm or 460 nm than 445 nm may be used. Alternatively, as the excitation light source 110, not limited to the semiconductor laser diodes, but LEDs (Light Emitting Diodes) may be used.

The afocal system 11 includes e.g. a convex lens 11a and a concave lens 11b. The afocal system 11 reduces the diameter of a luminous flux of a plurality of laser beams output from the excitation light source 110. Note that a collimator system may be placed between the afocal system 11 and the excitation light source 110 to convert the excitation light entering the afocal system 11 into a parallel luminous flux.

The homogenizer system 12 includes e.g. a first multi-lens array 12a and a second multi-lens array 12b. The homogenizer system 12 sets the light intensity distribution of the excitation light to a homogeneous state on a wavelength conversion layer, which will be described later, the so-called top-hat distribution. The homogenizer system 12 superimposes a plurality of small luminous fluxes output from the plurality of lenses of the first multi-lens array 12a and the second multi-lens array 12b on each other on the wavelength conversion layer with the collecting system 20. Thereby, the light intensity distribution of the excitation light B radiated onto the wavelength conversion layer is homogenized.

The collecting system 20 includes e.g. a first lens 20a and a second lens 20b. The collecting system 20 is provided in an optical path from the homogenizer system 12 to the wavelength conversion element 30, collects and enters the excitation light B into the wavelength conversion layer of the wavelength conversion element 30. In the embodiment, the first lens 20a and the second lens 20b are respectively formed using convex lenses.

The pickup system 60 includes e.g. a first collimating lens 62 and a second collimating lens 64. The pickup system substantially parallelizes the light output from the wavelength conversion element 30. The first collimating lens 62 and the second collimating lens 64 are respectively formed using convex lenses.

The first lens array 120 has a plurality of first lenses 122 for dividing the light output from the pickup system 60 into a plurality of partial luminous fluxes. The plurality of first lenses 122 are arranged in a matrix form within a plane orthogonal to the illumination light axis $100ax$.

The second lens array 130 has a plurality of second lenses 132 corresponding to the plurality of first lenses 122 of the first lens array 120. The second lens array 130 forms images of the respective first lenses 122 of the first lens array 120 near image formation areas of the light modulation device 4R, the light modulation device 4G, and the light modulation device 4B with the superimposing lens 150. The plurality of second lenses 132 are arranged in a matrix form within a plane orthogonal to the illumination light axis $100ax$.

The polarization conversion element 140 converts the lights output from the second lens array 130 into linearly-polarized lights. The polarization conversion element 140 includes e.g. a polarization separation film and a wave plate (both not shown).

The superimposing lens 150 collects and superimposes the respective partial luminous fluxes output from the polarization conversion element 140 near the image formation areas of the light modulation device 4R, the light modulation device 4G, and the light modulation device 4B.

(Wavelength Conversion Element)

Next, a configuration of the wavelength conversion element in the first embodiment will be explained.

Figure 3:
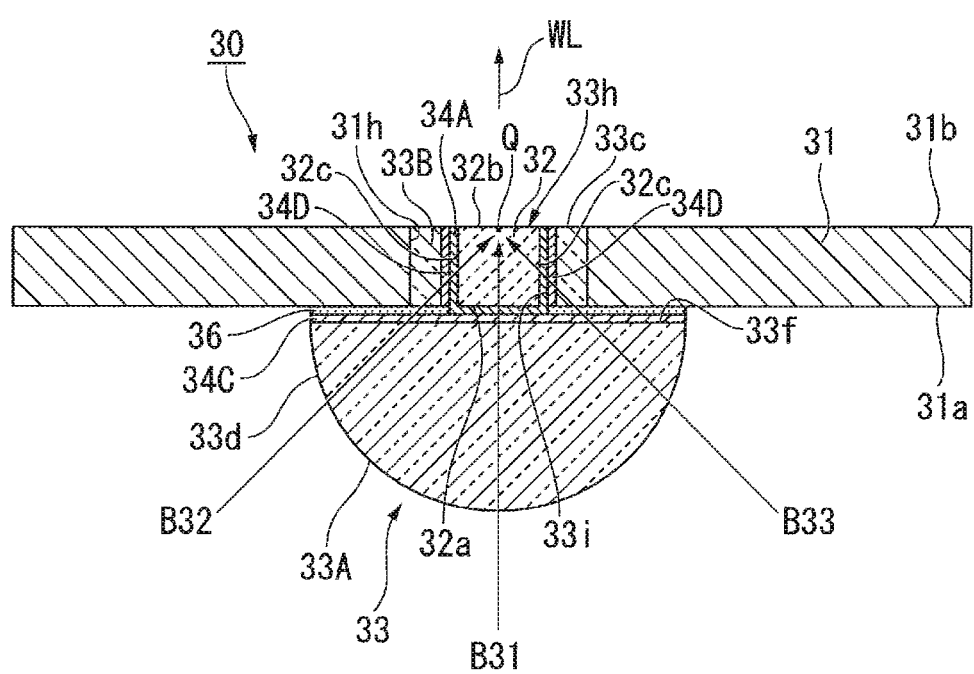
FIG. 3 is a sectional view of a wavelength conversion element in the first embodiment cut along a plane containing an illumination light axis in FIG. 2.

FIG. 3 is the sectional view of the wavelength conversion element 30 in the first embodiment cut along the plane containing the illumination light axis 100ax in FIG. 2.

As shown in FIG. 3, the wavelength conversion element 30 includes a support member 31, a light-transmissive member 33, a wavelength conversion layer 32, a dichroic film 34A, and a first anti-reflection film 34C.

The support member 31 is formed using a rectangular plate material and has a first surface 31a and a second surface 31b facing each other in a direction of a plate thickness. The support member 31 is placed with the first surface 31a toward the collecting system 20 and the second surface 31b toward the pickup system 60. In the support member 31, a hole 31h penetrating in the thickness direction between the first surface 31a and the second surface 31b is provided. The shape of the hole 31h is rectangular as seen from a normal direction of the first surface 31a.

The support member 31 may be formed using a material with light transmissivity such as glass or quartz, or may be formed using a material without light transmissivity such as metal. In the case of the metal material, a metal with a good heat dissipation property such as aluminum or copper is desirably used.

The wavelength conversion layer 32 is provided and supported inside of a through hole 33h of a second light-transmissive member 33B. The shape of the wavelength conversion layer 32 is rectangular as seen from a normal direction of a light exiting surface 32b of the wavelength conversion layer 32. The wavelength conversion layer 32 has a first light incident surface 32a crossing an optical axis of the excitation light B or a traveling direction of the excitation light B output from the excitation light source 110, the light exiting surface 32b opposed to the first light incident surface 32a, and second light incident surfaces 32c coupling the first light incident surface 32a and the light exiting surface 32b. The first light incident surface 32a is opposed to a planar surface 33f of a first light-transmissive member 33A, which will be described later. In the embodiment, the second light incident surfaces 32c are used as light incident surfaces separately from the first light incident surface 32a, and the area into which the excitation light B is entered is larger compared to a configuration using only the first light incident surface 32a as the light incident surface. The light exiting surface 32b is formed on the same plane as the second surface 31b of the support member 31.

Note that the shape of the wavelength conversion layer 32 is not limited to the rectangular shape as shown in the drawing, but the second light incident surfaces 32c may be surfaces having different orientations relative to the optical axis from the first light incident surface 32a and inclined at a predetermined angle toward the traveling direction of the excitation light relative to the first light incident surface 32a.

In the wavelength conversion layer 32, the blue excitation light B output from the excitation light source 110 is entered from the first light incident surface 32a and the second light incident surfaces 32c, and the yellow fluorescent light Y after wavelength conversion is output from the light exiting surface 32b. The wavelength conversion layer 32 contains fluorescent material particles (not shown) that convert and output the blue excitation light B into the yellow fluorescent light Y.

As the fluorescent material particles, e.g. a YAG (yttrium aluminum garnet) fluorescent material is used. Note that, as a material forming the fluorescent material particles, a single kind of material may be used or mixture of particles formed using two or more kinds of materials may be used. It is preferable to use a material having good heat resistance and surface workability for the wavelength conversion layer 32. As the wavelength conversion layer 32, a fluorescent material layer in which fluorescent material particles are dispersed in an inorganic binder such as alumina, a fluorescent material layer in which fluorescent material particles are sintered without using a binder, or the like is preferably used.

The dichroic film 34A is provided on the first light incident surface 32a and the four second light incident surfaces 32c of the wavelength conversion layer 32. The dichroic film 34A has a property of transmitting the blue excitation light B output from the excitation light source 110 and reflecting the yellow fluorescent light Y generated in the wavelength conversion layer 32.

The light-transmissive member 33 includes the first light-transmissive member 33A having a semi-spherical shape, and the second light-transmissive member 33B having a square tube shape.

The first light-transmissive member 33A includes a plano-convex lens having a semi-spherical shape in a sectional view, and has the planar surface 33f and a convex surface 33d. The first light-transmissive member 33A is provided with the planar surface 33f opposed to the first light incident surface 32a of the wavelength conversion layer 32 and fixed to the first surface 31a side of the support member 31. The convex surface 33d of the first light-transmissive member 33A is a curved surface projecting in an opposite direction to the traveling direction of the excitation light B. The center of the radius of curvature of the convex surface 33d is formed on the light exiting surface 32b of the wavelength conversion layer 32.

The second light-transmissive member 33B has the square tube shape along the outer shape of the wavelength conversion layer 32, and has the through hole 33h penetrating in the thickness direction of the wavelength conversion layer 32 along the optical axis. The dimension of the second light-transmissive member 33B in a direction crossing the optical axis (traveling direction of light) is appropriately set. An inner circumferential surface 33i of the through hole 33h is opposed to the four second light incident surfaces 32c forming the outer circumferential surface of the wavelength conversion layer 32. In the direction crossing the optical axis, the support member 31 is provided on a side of the second light-transmissive member 33B opposite to the wavelength conversion layer 32. The second light-transmissive member 33B has a planar surface 33c crossing the optical axis of the excitation light B or the traveling direction of the excitation light B, and the planar surface 33c is formed on the same plane as the second surface 31b of the support member 31.

These first light-transmissive member 33A and second light-transmissive member 33B are placed with the center axes aligned with each other on the optical axis of the excitation light B. The light-transmissive member 33, i.e., both the first light-transmissive member 33A and second light-transmissive member 33B of the embodiment are formed using sapphire having higher heat conductivity.

The first anti-reflection film 34C is provided on the planar surface 33f of the first light-transmissive member 33A. The first anti-reflection film 34C has a property of suppressing reflection of the excitation light B, and transmission efficiency of the excitation light B is improved by deposition of the film on the planar surface 33f of the first light-transmissive member 33A. Note that an anti-reflection film may be provided on the light exiting surface 32b of the wavelength conversion layer 32.

A second anti-reflection film 34D is provided to cover the inner circumferential surface of the second light-transmissive member 33B. The second anti-reflection film 34D suppresses reflection of the excitation light B transmitted through the second light-transmissive member 33B and entering the second light incident surfaces 32c of the wavelength conversion layer 32. The transmission efficiency of the excitation light B is improved by deposition of the second anti-reflection film 34D to be opposed to the second light incident surfaces 32c of the wavelength conversion layer 32. Thereby, in the case where the wavelength conversion layer is fitted in the through hole 33h of the second light-transmissive member 33B, even when an air layer intervenes between the dichroic film 34A and the second anti-reflection film 34D, the anti-reflection effect for the excitation light B transmitted through the second light-transmissive member 33B may be maintained.

A joining member 36 is provided between the first anti-reflection film 34C provided on the first light-transmissive member 33A and the first surface 31a of the support member 31 and joins the first light-transmissive member 33A to the support member 31. As the joining member 36, a member having higher thermal conductivity is preferable. For example, the member includes e.g. solder and a thermally conductive sheet. The material having higher thermal conductivity is used, and thereby, heat generated in the wavelength conversion layer 32 may be efficiently transferred from the support member 31 to the first light-transmissive member 33A and the heat dissipation property of the wavelength conversion layer 32 may be improved.

The joining member 36 provided between the second light-transmissive member 33B and the planar surface 33f (first anti-reflection film 34C) of the first light-transmissive member 33A should have light transmissivity.

Whether or not the joining member 36 provided between the support member 31 (first surface 31a) and the planar surface 33f (first anti-reflection film 34C) of the first light-transmissive member 33A has light transmissivity does not matter.

In the wavelength conversion element 30 of the embodiment, a focal point of the collecting system 20 is formed not on the first light incident surface 32a of the wavelength conversion layer 32, but inside of the wavelength conversion layer 32 including the light exiting surface 32b closer to the side in the traveling direction of light than the first light incident surface 32a. That is, the focal point of the collecting system 20 may be located in a position inside of the wavelength conversion layer 32 except the first light incident surface 32a and further on the optical axis of the excitation light B.

In the embodiment, a focal point Q of the collecting system 20 is formed at the center of the light exiting surface 32b of the wavelength conversion element 30. Accordingly, the excitation light B output from the collecting system 20 is transmitted through the first light-transmissive member 33A and output from the planar surface 33f toward the wavelength conversion layer 32 and the second light-transmissive member 33B. Of the excitation light B output from the planar surface 33f of the first light-transmissive member 33A, a center luminous flux (excitation light B31) enters the wavelength conversion layer 32 from the first light incident surface 32a, and peripheral luminous fluxes (excitation light B32 and excitation light B33) not entering the first light incident surface 32a are transmitted through the second light-transmissive member 33B and enter the wavelength conversion layer 32 from the second light incident surfaces 32c.

As described above, according to the configuration of the embodiment, the focal point Q of the collecting system 20 is set on the light exiting surface 32b of the wavelength conversion layer 32 and a light intensity distribution in a top-hat shape is formed on the light exiting surface 32b, and thereby, optical density of the excitation light B concentrated on the first light incident surface 32a of the wavelength conversion layer 32 in related art may be dispersed on the second light incident surfaces 32c.

That is, in the embodiment, in addition to the first light-transmissive member 33A, the second light-transmissive member 33B is provided around the optical axis of the wavelength conversion layer 32, and thereby, the side surfaces of the wavelength conversion layer 32 may be used as the second light incident surfaces 32c and the excitation light B may be respectively entered from the first light incident surface 32a and the second light incident surfaces 32c. The focal point Q of the collecting system 20 is formed on the light exiting surface 32b, and thereby, the respective beams (B31 to B33) of the excitation light B may respectively enter from on the first light incident surface 32a and the second light incident surfaces 32c.

As described above, the focal point of the collecting system 20 is formed inside of the wavelength conversion layer 32 on the optical axis of the excitation light B. That is, the focal point of the collecting system 20 is formed inside of the wavelength conversion layer 32 except the first light incident surface 32a, but including the light exiting surface 32b, and thereby, the optical density of the excitation light B on the first light incident surface 32a of the wavelength conversion layer 32 becomes lower. Accordingly, occurrence of a light saturation phenomenon may be suppressed and substantially all of the excitation light B entering the wavelength conversion layer 32 may be efficiently converted. Therefore, decrease and fluctuations of wavelength conversion efficiency of the wavelength conversion element 30 may be suppressed and wavelength conversion efficiency of the wavelength conversion element 30 (wavelength conversion layer 32) may be improved without reduction of the amount of excitation light B entering the wavelength conversion layer 32.

Note that, in the case where only the first light incident surface 32a is used as the light incident surface, the light saturation phenomenon may be suppressed by increase of the area of the first light incident surface 32a, however, if the area of the first light incident surface 32a is increased, the size of the light-transmissive member 33 (particularly, the first light-transmissive member 33A) proportionally increases and the wavelength conversion element 30 is upsized. Therefore, the side surfaces (second light incident surfaces 32c) of the wavelength conversion layer 32 are effectively used as the light incident surfaces.

Further, the second light-transmissive member 33B is formed using sapphire having higher heat conductivity. Accordingly, the heat generated in the wavelength conversion layer 32 may be not only dissipated from the first light-transmissive member 33A but also transferred to the support member 31 provided on the side of the second light-transmissive member 33B opposite to the wavelength conversion layer 32 via the second light-transmissive member 33B and dissipated in the support member 31. As described above, the heat generated in the wavelength conversion layer 32 may be efficiently dissipated in the first light-transmissive member 33A and the support member 31 via the second light-transmissive member 33B, and thereby, non-uniformity of the temperature of the wavelength conversion layer 32 in the same amount of excitation light may be suppressed and decrease and fluctuations of the conversion efficiency of the wavelength conversion element 30 may be further suppressed.

Note that, in the embodiment, the focal point Q of the collecting system 20 is formed on the light exiting surface 32b of the wavelength conversion layer 32 and the top-hat distribution is formed on the light exiting surface 32b, however, the configuration is not limited to that.

For example, the focal point may be formed in any position inside of the wavelength conversion layer 32 on the optical axis of the collecting system 20 except the first light incident surface 32a of the wavelength conversion layer 32.

Note that the light exiting surface 32b of the wavelength conversion layer 32 does not necessarily coincide with the planar surface 33c or the second surface 31b. Specifically, the light exiting surface 32b may be provided closer to a side opposite to the traveling direction of the excitation light B than the planar surface 33c or the second surface 31b.

Second Embodiment

Next, a light source device of the second embodiment of the invention will be explained.

A light source device 2B of the embodiment shown as below is different from the configuration of the above described first embodiment in that the blue-separation light source device 2B is provided. Accordingly, in the following explanation, the configuration of the light source device 2B will be specifically explained, and the explanation of the common parts will be omitted. Further, in the respective drawings used in the explanation, the component elements in common with FIGS. 1 to 3 have the same signs.

Figure 4:
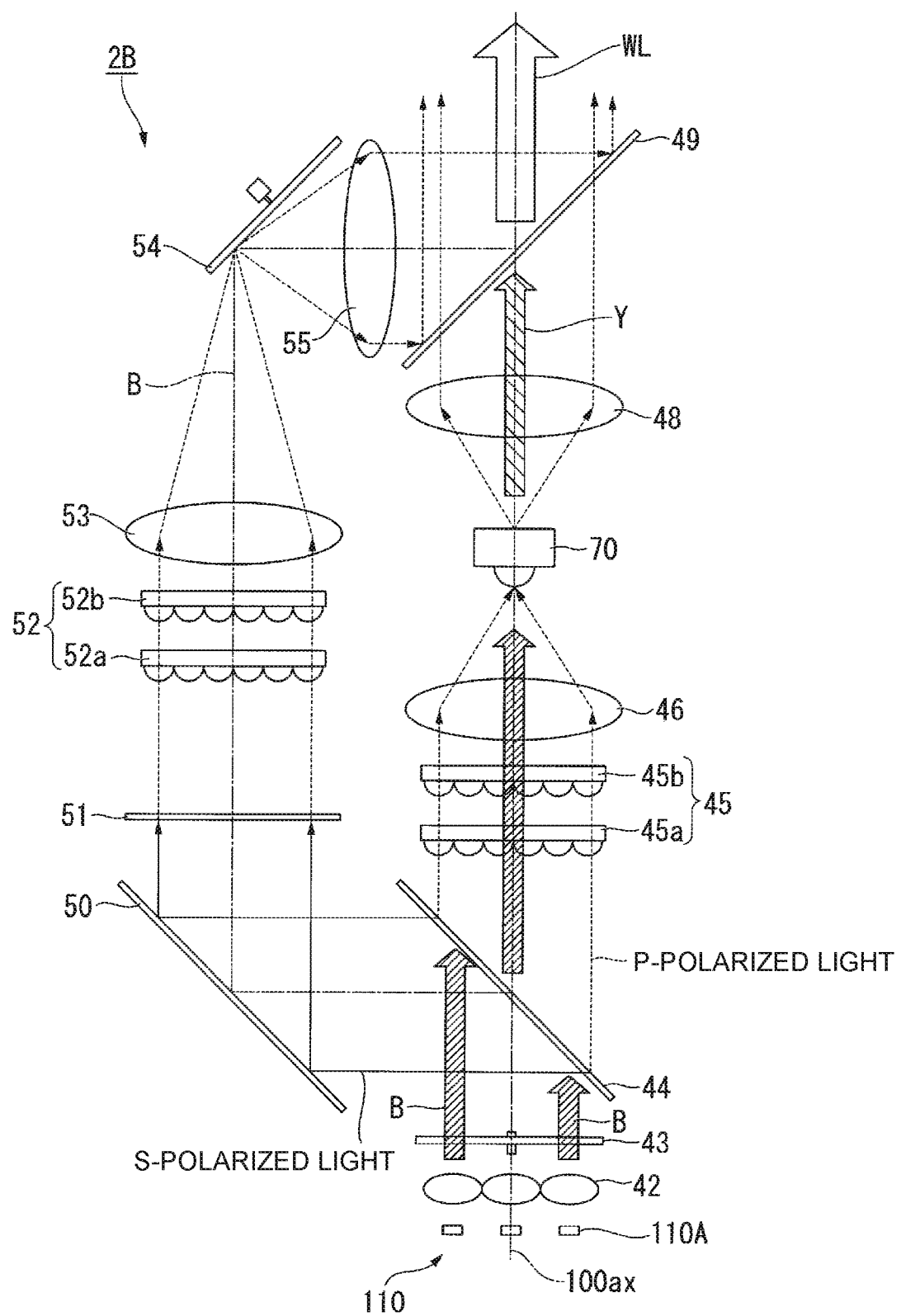
FIG. 4 shows a configuration of a light source device in a second embodiment.

FIG. 4 shows the configuration of the light source device 2B in the second embodiment.

As shown in FIG. 4, the light source device 2B generally includes the excitation light source 110, a collimator system 42, a wave plate 43, a polarization separation element 44, a first homogenizer system 45, a first collecting system 46, a wavelength conversion element 70, a first pickup lens 48, a dichroic mirror 49, a total reflection mirror 50, a second wave plate 51, a second homogenizer system 52, a second collecting system 53, a reflection rotatory diffusion element 54, and a second pickup lens 55.

Of the light source device 2B, the excitation light source 110, the collimator system 42, the wave plate 43, the polarization separation element 44, the first homogenizer system 45, the first collecting system 46, the wavelength conversion element 70, the first pickup lens 48, and the dichroic mirror 49 are sequentially arranged on the illumination light axis 100ax.

The wave plate 43 includes a half wave plate having a rotation mechanism. The wave plate 43 converts P-polarized lights and S-polarized lights of the excitation lights B collected by the collimating system 42 at an arbitrary ratio. Note that the wave plate 43 may be a quarter wave plate, and is not particularly limited as long as the plate may change the polarization states (the ratio of P-polarized lights and S-polarized lights) by rotation and movement.

The polarization separation element 44 is the so-called plate-type polarizing beam splitter (PBS) and has an inclined surface at an angle of 45° relative to the illumination light axis 100ax. The polarization separation element 44 passes the P-polarized light component of the incident light and reflects the S-polarized light component. The P-polarized light component is transmitted through the polarization separation element 44 and travels toward the first homogenizer system 45. The S-polarized light component is reflected by the polarization separation element 44 and travels toward the total reflection mirror 50.

The first homogenizer system 45 includes e.g. a first multi-lens array 45a and a second multi-lens array 45b. The first homogenizer system 45 sets the light intensity distribution of the excitation light B to a homogeneous state on the wavelength conversion layer, which will be described later, the so-called top-hat distribution. The first homogenizer system 45 superimposes a plurality of small luminous fluxes output from the plurality of lenses of the first multi-lens array 45a and the second multi-lens array 45b on each other on the wavelength conversion layer to be described later with the first collecting system 46. Thereby, the light intensity distribution of the excitation light B radiated onto the wavelength conversion layer to be described later is homogenized.

The first collecting system 46 is placed in an optical path from the first homogenizer system 45 to the wavelength conversion element 70, collects and enters the excitation light B into the wavelength conversion layer of the wavelength conversion element 70. In the embodiment, the first collecting system 46 is formed using a convex lens.

The first pickup lens 48 includes e.g. a convex lens and substantially parallelizes the yellow light Y output from the wavelength conversion element 70.

The dichroic mirror 49 is a mirror that passes the yellow light Y output from the wavelength conversion element 70 and reflects the blue light B entering from a direction orthogonal to the yellow light Y in the same traveling direction as that of the yellow light Y.

The total reflection mirror 50 is placed in an optical path of the blue light B and totally reflects the blue light separated in the polarization separation element 44 toward the second wave plate 51.

The second wave plate 51 is a quarter wave plate (λ/4 plate). The second wave plate 51 converts the S-polarized blue light B output from the polarization separation element 44 into circularly-polarized light.

The second homogenizer system 52 includes e.g. a first multi-lens array 52a and a second multi-lens array 52b. The second homogenizer system 52 superimposes a plurality of small luminous fluxes output from a plurality of lenses of the first multi-lens array 52a and the second multi-lens array 52b on each other on the reflection rotatory diffusion element 54 with the second collecting system 53. Thereby, the light intensity distribution of the blue light B radiated onto the reflection rotatory diffusion element 54 is homogenized.

The second collecting system 53 is placed in an optical path from the second homogenizer system 52 to the reflection rotatory diffusion element 54, collects and enters the blue light B that has been converted into the circularly-polarized light into the reflection rotatory diffusion element 54. In the embodiment, the second collecting system 53 is formed using a convex lens.

The reflection rotatory diffusion element 54 diffusionally reflects the beam output from the second collecting system 53 toward the second pickup lens 55. As the reflection rotatory diffusion element 54, it is preferable to use an element that diffusionally reflects the beam entering the reflection rotatory diffusion element 54 with characteristics of Lambert's reflection or closer to Lambert's reflection.

The second pickup lens 55 includes e.g. a convex lens and substantially parallelizes the blue light B output from the reflection rotatory diffusion element 54. The parallelized blue light B travels to the dichroic mirror 49 and is reflected in the dichroic mirror 49 in the same direction as that of the yellow light Y traveling in the direction orthogonal to the blue light B.

As described above, the beam (blue light B) output from the reflection rotatory diffusion element 54 is combined with the yellow fluorescent light Y transmitted through the dichroic mirror 49, and the white illumination light WL is obtained. The white illumination light WL enters the color separation system 3 shown in FIG. 1.

(Wavelength Conversion Element)

Next, a configuration of the wavelength conversion element in the second embodiment will be explained.

Figure 5:
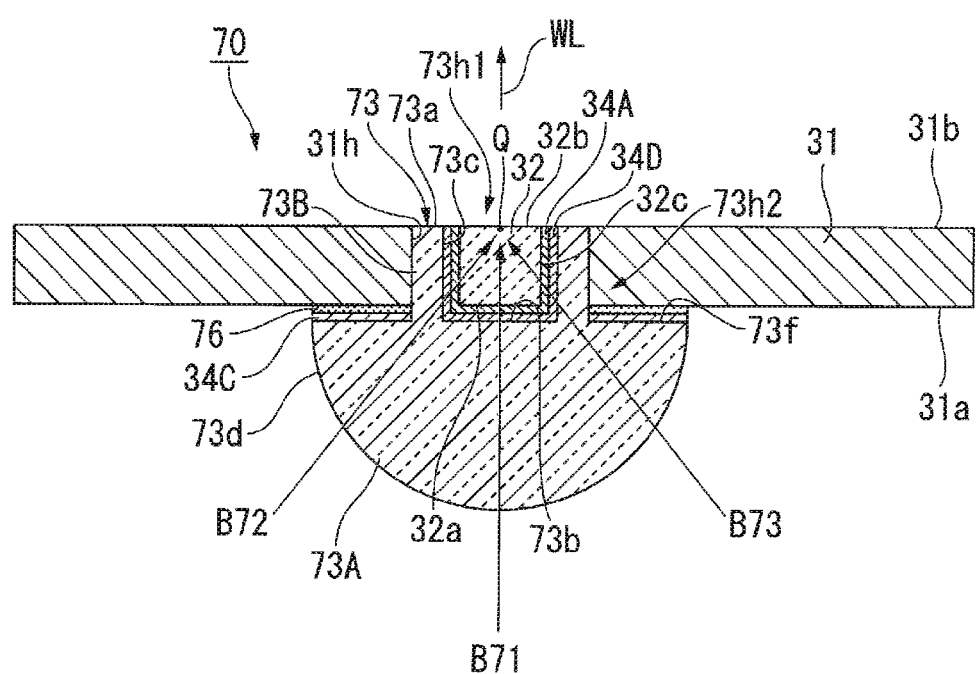
FIG. 5 is a sectional view of a wavelength conversion element in the second embodiment cut along a plane containing an illumination light axis in FIG. 4.

FIG. 5 is the sectional view showing the configuration of the wavelength conversion element 70 in the second embodiment.

As shown in FIG. 5, the wavelength conversion element 70 includes the support member 31, a light-transmissive member 73, the wavelength conversion layer 32, the dichroic film 34A, the first anti-reflection film 34C, the second anti-reflection film 34D, and a joining member 76.

The light-transmissive member 73 has a first light-transmissive part 73A and a second light-transmissive part 73B that transmit excitation light.

The second light-transmissive part 73B has a square tube shape, and has a planar surface 73a crossing the optical axis of the excitation light B or the traveling direction of the excitation light B, a first concave portion 73h1 opening in a rectangular shape in the planar surface 73a, and a second concave portion 73h2 formed in a rectangular shape over a peripheral edge. The planar surface 73a is formed on the same plane as the second surface 31b of the support member 31. Further, the light exiting surface 32b is formed on the same plane as the second surface 31b of the support member 31. Note that the light exiting surface 32b of the wavelength conversion layer 32 does not necessarily coincide with the planar surface 73a or the second surface 31b. Specifically, the light exiting surface 32b may be provided closer to a side opposite to the traveling direction of the excitation light B than the planar surface 73a or the second surface 31b.

The first light-transmissive part 73A has a planar surface 73f forming a part of the second concave portion 73h2 and crossing the optical axis of the excitation light B or the traveling direction of the excitation light B, and a curved surface 73d projecting in the opposite direction to the traveling direction of the excitation light B.

The light-transmissive member 73 has an integrated structure of the first light-transmissive part 73A and the second light-transmissive part 73B.

The wavelength conversion layer 32 is placed within the first concave portion 73h1 formed on the second light-transmissive part 73B side of the light-transmissive member 73. In the wavelength conversion layer 32, the first light incident surface 32a is opposed to a bottom surface 73b of the first concave portion 73h1 via the dichroic film 34A and the second anti-reflection film 34D, which will be described later, and the second light incident surfaces 32c are opposed to an inner circumferential surface 73c of the first concave portion 73h1 via the dichroic film 34A and the second anti-reflection film 34D to be described later. The dichroic film 34A is provided on the first light incident surface 32a and the second light incident surfaces 32c of the wavelength conversion layer 32, and further, the second anti-reflection film 34D is provided on the dichroic film 34A.

The dichroic film 34A is provided on the first light incident surface 32a and the second light incident surfaces 32c of the wavelength conversion layer 32. The dichroic film 34A has the property of transmitting the blue excitation light B output from the excitation light source 110 and reflecting the yellow fluorescent light Y generated in the wavelength conversion layer 32.

The second anti-reflection film 34D is provided to cover the outer surface of the dichroic film 34A provided on the first light incident surface 32a and the second light incident surfaces 32c of the wavelength conversion layer 32. The second anti-reflection film 34D suppresses reflection of an excitation light B71 transmitted through the first light-transmissive part 73A and entering the first light incident surface 32a of the wavelength conversion layer 32 and suppresses reflection of an excitation light B72 or an excitation light B73 transmitted through the second light-transmissive part 73B and entering the second light incident surfaces 32c of the wavelength conversion layer 32. Transmission efficiency of the excitation light B is improved by deposition of the second anti-reflection film 34D on the first light incident surface 32a and the second light incident surfaces 32c of the wavelength conversion layer 32. Note that the second anti-reflection film 34D may be formed on the inner circumferential surface of the first concave portion 73h1.

The support member 31 is joined to the light-transmissive member 73 via the joining member 76. The joining member 76 is placed between the first anti-reflection film 34C provided on the planar surface 73f of the first light-transmissive part 73A and the first surface 31a of the support member 31 and joins the surfaces in a good condition. The support member 31 is located on a side of the second light-transmissive part 73B opposite to the wavelength conversion layer 32 in a direction crossing the optical axis of the excitation light B or the traveling direction of the excitation light B.

Also, in the wavelength conversion element 70 of the embodiment, the focal point Q of the first collecting system 46 is formed on the light exiting surface 32b of the wavelength conversion layer 32 on the optical axis of the excitation light B. Further, in the embodiment, the second light-transmissive part 73B opposed to the second light incident surfaces 32c of the wavelength conversion layer 32 is provided, and the second light-transmissive part 73B is integrally formed with the first light-transmissive part 73A having a semi-spherical shape.

Accordingly, of the excitation light B output from the first collecting system 46, a center luminous flux (excitation light B71) is transmitted through the first light-transmissive part 73A and enters the wavelength conversion layer 32 from the first light incident surface 32a, and peripheral luminous fluxes (excitation light B72 and excitation light B73) not entering the first light incident surface 32a are transmitted through the second light-transmissive part 73B and enter the wavelength conversion layer 32 from the second light incident surfaces 32c.

As described above, as is the case with the above described first embodiment, the focal point Q of the first collecting system 46 is set on the light exiting surface 32b of the wavelength conversion layer 32 and a light intensity distribution in a top-hat shape is formed on the light exiting surface 32b, and thereby, optical density of the excitation light B entering only the first light incident surface 32a may be dispersed on the second light incident surfaces 32c. Therefore, the optical density of the excitation light B on the first light incident surface 32a of the wavelength conversion layer 32 becomes lower, and thereby, occurrence of a light saturation phenomenon may be suppressed and wavelength conversion efficiency in the wavelength conversion layer 32 may be improved.

According to the configuration of the embodiment, the light-transmissive member 73 having an integrated structure of the first light-transmissive part 73A and the second light-transmissive part 73B is provided, and thereby, work of alignment of the members with each other and assembly of the light-transmissive member is unnecessary.

As above, the preferred embodiments according to the invention are explained with reference to the accompanying drawings, however, obviously, the invention is not limited to those examples. It is clear that a person skilled in the art could think of various modified examples or altered examples within the scope of the technical idea described in the appended claims and it is understood that the examples naturally belong to the technical scope of the invention.

Next, configurations of modified examples of the wavelength conversion element will be explained.

Modified Example 1

Figure 6:
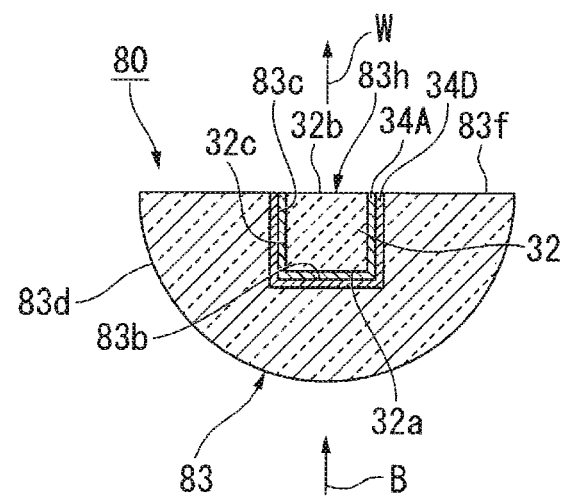
FIG. 6 shows a configuration of a wavelength conversion element of modified example 1.

FIG. 6 shows the configuration of the wavelength conversion element of modified example 1. FIG. 6 is a sectional view cut along a plane along the traveling direction of the excitation light B.

A wavelength conversion element 80 shown in FIG. 6 has a light-transmissive member 83 including a convex lens having a semi-spherical shape in a sectional view, the wavelength conversion layer 32 placed within a concave portion 83h of the light-transmissive member 83 and having the first light incident surface 32a and the light exiting surface 32b opposed to the first light incident surface 32a, and the dichroic film 34A provided on the first light incident surface 32a and the second light incident surfaces 32c of the wavelength conversion layer 32. The light-transmissive member 83 has a planar surface 83f crossing the optical axis of the excitation light B or the traveling direction of the excitation light B, a convex surface 83d projecting in the opposite direction to the traveling direction of the excitation light B, and the concave portion 83h opening in the planar surface 83f, and the wavelength conversion layer 32 and the dichroic film 34A are provided within the concave portion 83h. The first light incident surface 32a is opposed to a bottom surface 83b of the concave portion 83h of the light-transmissive member 83 via the dichroic film 34A, and the second light incident surfaces 32c are opposed to an inner circumferential surface 83c of the concave portion 83h. Note that the second anti-reflection film 34D is formed on the surface of the dichroic film 34A or the inner circumferential surface 83c of the concave portion 83h. Further, the second anti-reflection film 34D is formed on the surface of the dichroic film 34A or the bottom surface 83b of the concave portion 83h.

According to the configuration of the embodiment, the wavelength conversion layer 32 is buried into the concave portion 83h of the light-transmissive member 83, and therefore, the second light-transmissive member 33B (FIG. 3) used in the first embodiment is unnecessary. Further, the excitation light B entering from the convex surface 83d of the light-transmissive member 83 enters the wavelength conversion layer 32 from one of the first light incident surface 32a and the second light incident surfaces 32c of the wavelength conversion layer 32, and accordingly, the optical density of the excitation light B in the first light incident surface 32a may be reduced. Furthermore, the heat generated in the wavelength conversion layer 32 may be effectively dissipated in the light-transmissive member 83 formed using sapphire having higher heat conductivity, and thereby, decrease of conversion efficiency in the wavelength conversion layer 32 may be suppressed.

Note that, in the case where the light-transmissive member 83 is fixed to a support member, the planar surface 83f and the support member may be fastened so that the support member may not be opposed to the light exiting surface 32b. Alternatively, a concave portion is formed over the peripheral edge of the second light incident surfaces 32c, a support member is provided in contact with the concave portion, and thereby, the light-transmissive member 83 may be fixed to the support member.

Modified Example 2

Figure 7:
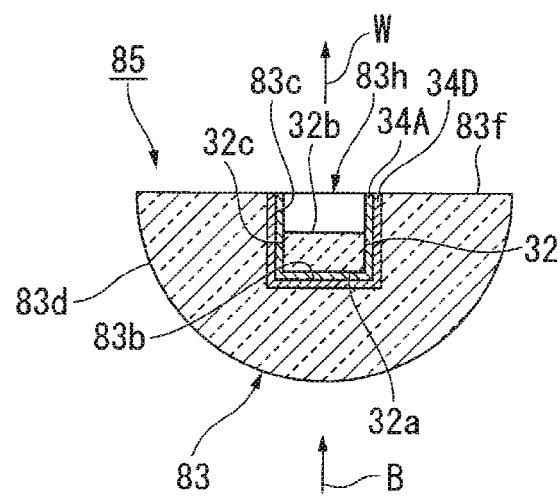
FIG. 7 shows a configuration of a wavelength conversion element of modified example 2.

FIG. 7 shows the configuration of the wavelength conversion element of modified example 2. FIG. 7 is a sectional view cut along the plane along the traveling direction of the excitation light B.

Like a wavelength conversion element 85 shown in FIG. 7, the light exiting surface 32b of the wavelength conversion layer 32 does not necessarily coincide with the planar surface 83f of the light-transmissive member 83. The dichroic film 34A has the property of transmitting the excitation light B and reflecting the yellow fluorescent light Y generated in the wavelength conversion layer 32, and accordingly, the light toward the inner circumferential surface 83c of the concave portion 83h of the lights output from the light exiting surface 32b is reflected on the dichroic film 34A on the inner circumferential surface 83c and output to outside of the light-transmissive member 83. Note that the second anti-reflection film 34D is formed on the surface of the dichroic film 34A or the inner circumferential surface 83c of the concave portion 83h. Further, the second anti-reflection film 34D is formed on the surface of the dichroic film 34A or the bottom surface 83b of the concave portion 83h.

Also, in this configuration, the excitation light B enters the first light incident surface 32a and the second light incident surfaces 32c of the wavelength conversion layer 32, and accordingly, the optical density in the first light incident surface 32a may be reduced.

Note that, as is the case of modified example 1, in the case where the light-transmissive member 83 is fixed to a support member, the planar surface 83f and the support member may be fastened so that the support member may not be opposed to the light exiting surface 32b. Alternatively, a concave portion is formed over the peripheral edge of the second light incident surfaces 32c, a support member is provided in contact with the concave portion, and thereby, the light-transmissive member 83 may be fixed to the support member.

The entire disclosure of Japanese Patent Application No. 2016-231400, filed on Nov. 29, 2016 is expressly incorporated by reference herein.

What is claimed is:

1. A light source device comprising:
an excitation light source that outputs an excitation light;

a collecting system that collects the excitation light;

a light-transmissive member that transmits the excitation light output from the collecting system; and a wavelength conversion layer having a first light incident surface crossing a traveling direction of the excitation light, a light exiting surface opposed to the first light incident surface, and a second light incident surface coupling an end portion of the first light incident surface and an end portion of the light exiting surface, wherein a focal point of the collecting system is formed inside of the wavelength conversion layer, and the wavelength conversion layer wavelength-converts the excitation light entering from the first light incident surface and the second light incident surface and generates a fluorescent light.

2. The light source device according to claim 1, wherein the focal point of the collecting system is formed inside of the wavelength conversion layer except the first light incident surface, and including the light exiting surface of the wavelength conversion layer on an optical axis of the excitation light.

3. The light source device according to claim 2, further comprising a support member that supports the wavelength conversion layer and the light-transmissive member at a side of the light-transmissive member opposite to the wavelength conversion layer in a direction crossing the traveling direction of the excitation light.

4. The light source device according to claim 2, wherein the light-transmissive member includes:

a first light-transmissive member having a planar surface crossing the traveling direction of the excitation light and a curved surface projecting in an opposite direction to the traveling direction of the excitation light, and placed with the planar surface opposed to the first light incident surface; and a second light-transmissive member placed at a side of the planar surface of the first light-transmissive member and having a hole penetrating in a direction along the optical axis, wherein in a state in which the wavelength conversion layer is placed within the hole, the second light incident surface of the wavelength conversion layer is opposed to an inner circumferential surface of the hole.

5. The light source device according to claim 4, further comprising a support member that supports the wavelength conversion layer and the light-transmissive member at a side of the second light-transmissive member opposite to the wavelength conversion layer in a direction crossing the traveling direction of the excitation light, wherein the first light-transmissive member is joined to the support member via a joining member.

6. The light source device according to claim 2, wherein the light-transmissive member has a planar surface crossing the traveling direction of the excitation light, a concave portion opening in the planar surface, and a curved surface projecting in an opposite direction to the traveling direction of the excitation light, and in a state in which the wavelength conversion layer is placed within the concave portion, the first light incident surface is opposed to a bottom surface of the concave portion and the second light incident surface is opposed to an inner circumferential surface of the concave portion.

7. The light source device according to claim 6, further comprising a support member that supports the wavelength conversion layer and the light-transmissive member at a side of the light-transmissive member opposite to the wavelength conversion layer in a direction crossing the traveling direction of the excitation light, wherein the light-transmissive member has a second concave portion for placement of the support member.

8. The light source device according to claim 1, further comprising a support member that supports the wavelength conversion layer and the light-transmissive member at a side of the light-transmissive member opposite to the wavelength conversion layer in a direction crossing the traveling direction of the excitation light.

9. The light source device according to claim 1, wherein the light-transmissive member has a planar surface crossing the traveling direction of the excitation light, a concave portion opening in the planar surface, and a curved surface projecting in an opposite direction to the traveling direction of the excitation light, and in a state in which the wavelength conversion layer is placed within the concave portion, the first light incident surface is opposed to a bottom surface of the concave portion and the second light incident surface is opposed to an inner circumferential surface of the concave portion.

10. The light source device according to claim 9, further comprising a support member that supports the wavelength conversion layer and the light-transmissive member at a side of the light-transmissive member opposite to the wavelength conversion layer in a direction crossing the traveling direction of the excitation light, wherein the light-transmissive member has a second concave portion for placement of the support member.

11. The light source device according to claim 1, wherein the light-transmissive member is formed using sapphire.

12. The light source device according to claim 1, wherein a dielectric multilayer that transmits the excitation light and reflects the fluorescent light is provided between the first light incident surface of the wavelength conversion layer and the light-transmissive member and is provided between the second light incident surface of the wavelength conversion layer and the light-transmissive member.

13. A projector comprising:

the light source device according to claim 1;

a light modulation device that modulates a light output from the light source device according to image information and generates an image light; and a projection system that projects the image light.

* * * * *